Jan. 27, 1970 D. S. FOREMAN ET AL 3,492,426

TELEPHONE ALARM SYSTEM WHERE A CENTRAL STATION ALERTS A PRESELECTED AGENCY IN RESPONSE TO A RECEIVED PULSE CODED FREQUENCY SIGNAL IDENTIFYING A PARTICULAR ALARM CONDITION AT A PARTICULAR SUBSCRIBER STATION

Filed March 18, 1965 3 Sheets-Sheet 1

INVENTORS.
DAVIS SIDNEY FOREMAN
LANCE HENRIQUES, JR.
BY [signature]
AGENT.

TELEPHONE ALARM SYSTEM WHERE A CENTRAL STATION ALERTS A PRESELECTED AGENCY IN RESPONSE TO A RECEIVED PULSE CODED FREQUENCY SIGNAL IDENTIFYING A PARTICULAR ALARM CONDITION AT A PARTICULAR SUBSCRIBER STATION
Filed March 18, 1965 3 Sheets-Sheet 2

INVENTORS.
DAVIS SIDNEY FOREMAN
LANCE HENRIQUES, JR.
BY
AGENT.

Jan. 27, 1970 D. S. FOREMAN ET AL 3,492,426

TELEPHONE ALARM SYSTEM WHERE A CENTRAL STATION ALERTS A PRESELECTED AGENCY IN RESPONSE TO A RECEIVED PULSE CODED FREQUENCY SIGNAL IDENTIFYING A PARTICULAR ALARM CONDITION AT A PARTICULAR SUBSCRIBER STATION

Filed March 18, 1965 3 Sheets-Sheet 3

INVENTORS.
DAVIS SIDNEY FOREMAN
LANCE HENRIQUES, JR.
BY
AGENT.

3,492,426

TELEPHONE ALARM SYSTEM WHERE A CENTRAL STATION ALERTS A PRESELECTED AGENCY IN RESPONSE TO A RECEIVED PULSE CODED FREQUENCY SIGNAL IDENTIFYING A PARTICULAR ALARM CONDITION AT A PARTICULAR SUBSCRIBER STATION

Davis Sidney Foreman, Putnam Valley, N.Y. 10579, and Lance Henriques, Jr., New York, N.Y.; said Henriques assignor to said Foreman Filed Mar. 18, 1965, Ser. No. 440,756
Int. Cl. H04m *11/04*
U.S. Cl. 179—5 9 Claims

ABSTRACT OF THE DISCLOSURE

An alarm system operating over conventional telephone lines using the telephone instrument at each subscriber station constituting a protected premises, wherein detection of an unusual condition at one of the subscriber stations initiates the dialing of a central alerting station and the transmission to the latter of a two-part coded signal identifying the calling station in a pulse code and, via a predetermined-frequency code, the unusual condition. Means at the central alerting station is responsive to the coded signal and automatically retrieves from a memory bank or equivalent unit, the prerecorded instructions for calling the telephone to be alerted. The frequency code is transmitted by an electroacoustical transducer over the telephone handset at the protected premises.

The present invention relates to warning and detection systems adapted to transmit an indication of an undesirable situation to a remote location over the conventional telephone lines and circuits and, more particularly, it relates to an integrated system of this character having a central station with which a plurality of subscriber stations can be coupled.

It is known to provide, in conjunction with a telephone-communication system having a multiplicity of subscriber stations and an exchange adapted to direct a signal along any of a number of lines, a central alerting station designed to be called automatically by a subscriber station automatically upon the existence of a situation requiring warning or information conveyance. Thus, there are available automatic alarm systems designed to operate in conjunction with the telephone line to deliver a warning signal indicative of instrusion to a receiving station. These prior systems have a number of disadvantages including: (1) The inability to communicate indications of which of different types of emergencies exist (e.g. of burglary, medical emergency, fire, elevator or heating-system failure); (2) when a number of distinct indications are required, they must frequently be directed to different service areas, for instance the Police Department, Fire Department, hospital etc. and existing systems evidence an inability to directly channel the indication of different emergencies to different succorrendering agencies such as the Police Department, Fire Department, medical group etc.; (3) many existing devices using the subscriber's telephone lines require interference with the telephone circuitry and thus must either be integrated with the telephone equipment at the central exchange or are unsuitable unless special transmission lines are provided; (4) Many conventional systems for transmitting warnings in this manner are further disadvantaged by the fact that only a relatively small number of subscribers can be handled by the central station because of an inability of the central station to distinguish effectively just which emergency condition exists at each subscriber's station.

It is thus an important object of the present invention to provide an alarm or communication system of the character described, which cooperates with the telephone apparatus without any modification of existing telephone lines or equipment; another object is to provide a system capable of delivering a plurality of distinct indications from any one of a multiplicity of subscribers via the phone lines to a central co-ordinating station with positive identification of the subscriber.

A more specific object of this invention is to provide a device at subscriber station operable in conjunction with conventional subscriber telephone equipment for the transmission of selected indicia identifying the type of difficulty to the central station.

Yet another object of this invention is to provide a method of transmitting information from any of a multiplicity of subscribers and thereby initiating a warning to any one of a number of aid-dispatching agencies in accordance with the particular requirements of the subscriber and independently of different requirements from one subscriber to another.

Still a further object of the invention is to provide a system of the character described which is relatively simple, inexpensive, can be tested without difficulty, is centrally deactivated, and is free from the myriad of problems now interfering with multiple-indication transmission from subscriber stations.

These objects and others which will become apparent hereinafter are attained, in accordance with the present invention, by a method of automatically initiating the transmitting warning signals over conventional subscriber telephone lines via one or more telephone exchanges to a central-system station (i.e. a central alerting station), which comprises the steps of open-circuiting the transmission line at a subscriber station having a particular problem; transmitting the telephone number of a central-system station to connect the operating subscriber station with the central-system station telephone, transmitting a further set of signals to the central-system station over this line indicative of the identification of the subscriber station and enabling the central-system station to determine such identification and further coding these signals of the second set by imparting to them a characteristic frequency associated with the particular problem; retrieving at the central-system station previously stored data corresponding to the subscriber identification; and selecting from these data the pertinent instructions in accordance with the characteristic frequency of the signals.

The system and method described above afford many advantages over conventional system because the data stored at the central or decoding station can be individual to each of the subscribers. Thus, a first subscriber may have his subscriber station adapted to transmit a set of signals of one frequency to indicate a burglary and the instruction to have the central station notify the regional Police Headquarters whereas a second subscriber may instruct that, upon a burglary indication, warning be given to a private police organization or an insurance company. The same frequency may be employed by still another subscriber, in response to a fire warning, to notify the local Fire Department. The previously stored information can be considered in terms of instruction sets each of which contains a particular item of information or data associated with a respective frequency. At the central station, a data-storage or data-retrieval computer or the like is activated upon receipt of the second set of signals (providing the identification of the subscriber) to substantially instantaneously make available all of the information and instruction groups associated with this subscriber. Read-out of this information, i.e. selecting among the data, is determined by the frequency of the signal.

The system can thus include, at each subscriber station, a device including a mechanism for initially opening the telephone line for transmission of the signals as well as a signal-storage device upon which the telephone number of the central-system station as well as the subsequently transmitted indicia identifying the subscriber are recorded.

Further in the device according to this invention, the means for rendering the telephone line effective can include a solenoid-actuated mechanism for lifting the telephone handset and placing the telephone line in a condition of readiness for dialing. In order to avoid interference with the conventional equipment at the subscriber's station, the dailing of the central-system station is effected by a relay or the like provided for co-operation with the standard telephone interrupter or disconnect button for tripping the latter in accordance with the telephone number of the central station or it can initiate frequency dialing pulses compatible with the audio-dialing system. While any means of transmitting the second set of signals can be used, in accordance with the present invention, it is pre ferred to employ either an inductive device or an electroacoustic transducer cooperating with the receiver of the handset for producing an audio signal of a characteristic frequency identifying the emergency or difficulty encountered and signalled to the central-system station. This latter signal can be generated by a variable-frequency oscillator whose plurality of stable modes, each correspond to a particular danger indication and can be interrupted or pulsed by the same or another mechanism used originally for the generation of the telephone number.

According to a further feature of this invention, means is provided at the central-system station responsive to the identifying pulses for abstracting from the data stored there, the instruction data that corresponds to the calling subscriber, selecting among the abstracted data in accordance with the transmitted frequency, alerting the appropriate aid-rendering department as to the difficulty either via an automatic transmission of a prerecorded message or the intervention of an operator monitoring the read-out of the information-storage means.

According to another feature of the invention, to preclude spurious signals, the central operator may transmit via the central station and subscriber station lines, while they remain interconnected by the telephone exchange, a return signal to test whether it is indeed the particular frequency or danger indication to which the storage means has responded and/or apply a restoring signal to disconnect the subscriber station. According to another specific feature of the method of this invention, the operator is enabled to check to ascertain if the call actually derives from the particular subscriber station indicated by the received signal by a call to the subscriber's number over another telephone line; if a "busy" signal results it will indicate that that subscriber's line is transmitting.

While each subscriber station may be provided with a variety of devices for activating the subscriber's pulse-and-tone generator of the present invention, it is desirable that whatever actuating means is employed be compatible with whatever systems serve as the detection means. Thus, a burglar alarm may be provided solely for the energization of the subscriber system although, in the general case, a local burglar alarm will be provided, this unit having switches, trips, window tapes, electric-eye detectors and the like possibly co-operating with an alarm bell ringing in the region of the protected premises. Since a connection to such an alarm system might transgress rights of the company providing the alarm, the present invention further provides either direct or remote pickup means; the latter may be of an inductive or capacitive nature co-operating with the conventional alarm detector for actuating the subscriber station to transmit an indication of danger to the central system station. Similar considerations also apply to fire-alarm systems. In almost all cases it will be desirable to provide, in addition to the automatic pickup mentioned above, one or more switches in the proximity of or remote from the subscriber sending device enabling a manual triggering of the working sequence mentioned above or manual deactivation during business hours.

A further feature of the present invention resides in the use, in the subscriber station co-operating with the telephone, of a crystal-controlled multivibrator transistor oscillator, the audiofrequency signal generated thereby being used herein for transmitting the subscriber identification code and being selected by applying different voltages to the base of at least one of the multivibrator transistors by a selective connection of resistors thereto. Thus, three, four or more different tones can be generated merely by the selective connection of the corresponding number of resistors to supply the different potentials required for the several frequencies. The electric-current input to the multivibrator circuit can be interrupted in order to provide the pulses serving to identify the subscriber. It has been found to be desirable to provide one or more polarized relays in circuit with the frequency-controlling resistors in such manner that the application of a voltage of one polarity to one of these relays will entail a first switching mode corresponding to the connection of a respective resistor in the oscillator circuit whereas the application of the opposite polarity will produce another switch mode.

The information-storage means at the subscriber-station side of the system can be any device capable of generating the two pulse trains according to this invention. Thus, pneumatic or hydraulic devices can be used, although a cam-operated switch means whose cams are driven by a motor energized by the polarized relays upon detection of a danger indication is suitable; it has been found, however, that better results are obtained when a tape or strip is provided with the information in the form of a magnetic recording, perforations, regions of varying optical density or electrical conductivity etc., the band being placed upon a pair of sprockets or other tape-transporting means. The detection device will, of course, be determined by the method used for recording the information so that, when magnetic recording is used, a pickup head and preamplifier may be employed, whereas optical recording will require a light-sensitive cell and suitable amplifier arrangement. A perforated tape can use brush-type wipers or the like whereas electrodes are employed when the tape is provided with regions of different electrical conductivity. Punched or embossed cards may also be used for either or both the dialing and identification sequences of signals.

The information-storage means at the central-system station (containing the respective sets of information) can be constituted by a punch-card collator of any conventional type (the information being provided in sets upon respective perforated cards), this collator being adapted to retrieve the subscriber's card from the stack and pass it through a read-out device, only the pertinent data (corresponding to that selected by the tone received at the central station) being fed into a transmission system and the operator's station. The transmission system may include a bank of tape recorders or the like having messages selectable in accordance with the data retrieved from the cards for the automatic transmission of a warning to the agency involved. If the message is specialized, however, the simultaneous alerting of the operator will transfer to him the responsibility to him to communicate with the appropriate agency and, if the subscriber's recorded data so require, with the subscriber himself at any third location of which he may have advised the central station; a magnetic memory may be used when the number of subscribers is great.

According to a further aspect of this invention the initiation of the dialing pulses may be delayed until the telephone circuits are capable of receiving and acting upon same as evidenced by a dial tone at the ear-piece of the subscriber's telephone.

Still another aspect of the invention includes the provison for transmission by the central system station to the subscriber's station of signals in response to the particular instruction set to activate a pick-up adjacent to the ear-piece for starting or stopping devices such as motors, bells, pumps, oilburners, fans, cameras, tape-recorders etc. as required by the emergency instruction set.

The above and other objects, features and advantages of the present invention will become more readily apparent from the following specific description of an embodiment of a system according to the invention, reference being made to the accompanying drawing in which.

Figure 1:
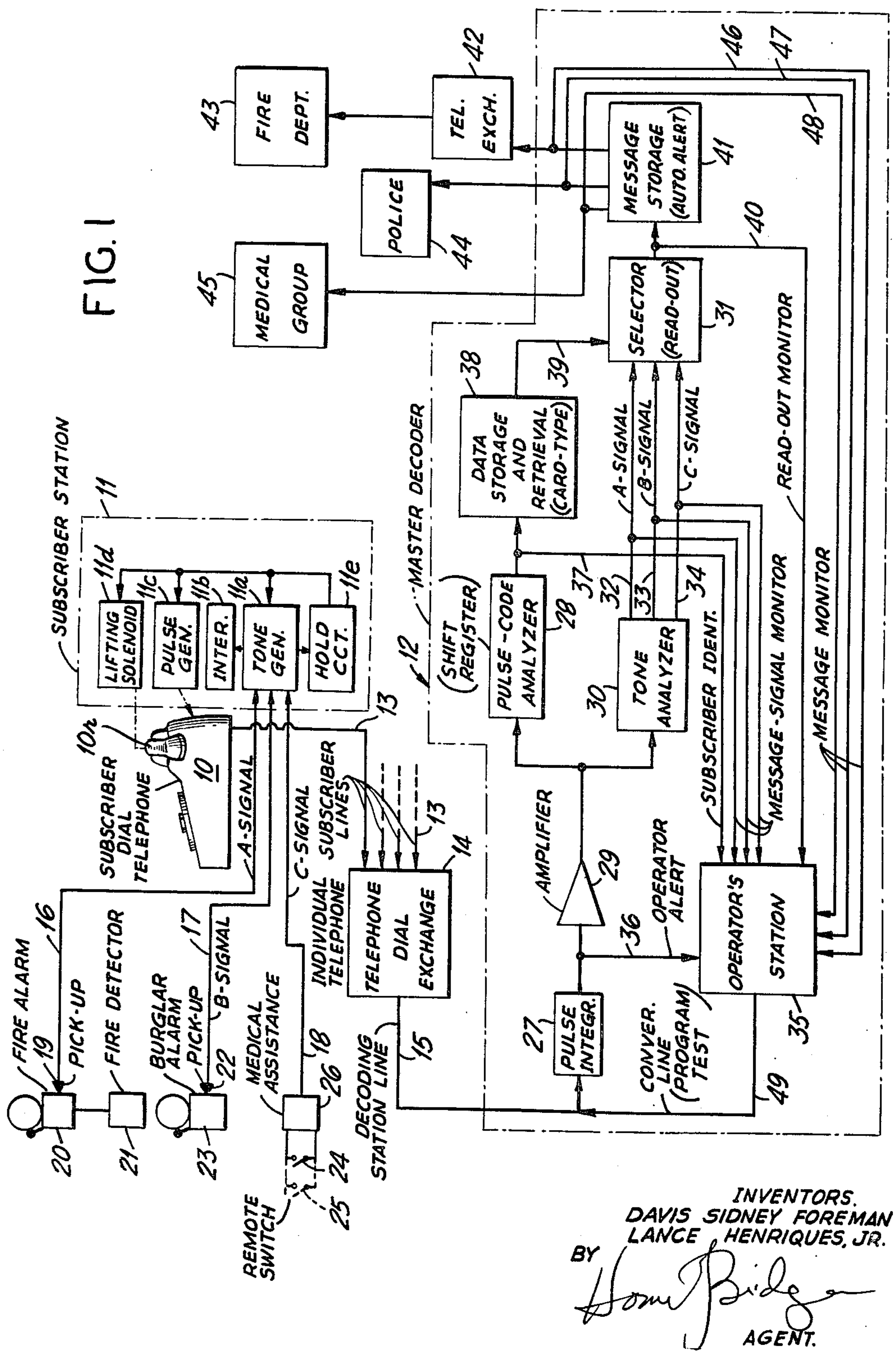
FIG. 1 is a block diagram of a system embodying the invention.
Figure 2:
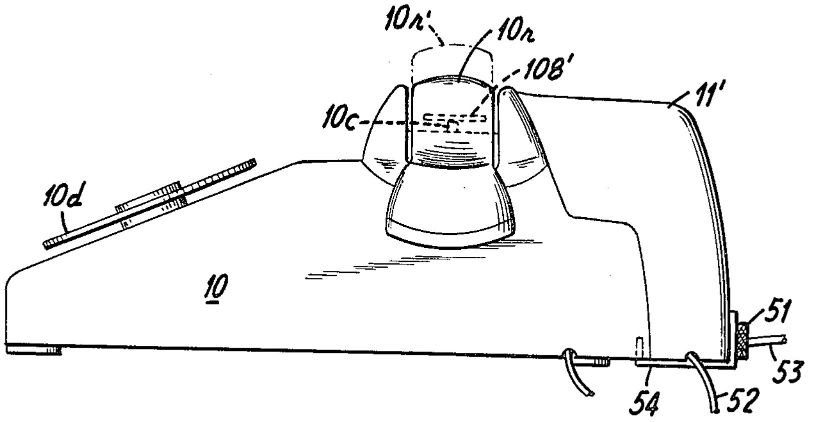
FIG. 2 is a side-elevational view of a conventional telephone set provided with a subscriber-station alerting unit for use with this system.
Figure 3:
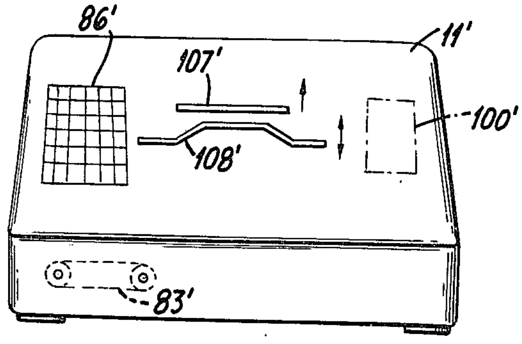
FIG. 3 is a front elevational view of the unit, somewhat in diagrammatic form.

In FIG. 1 I show a conventional dial telephone at the subscriber station which is provided with an alerting unit 11 according to this invention for automatically responding to a danger or warning signal form a suitable source and transmitting such warning to a master decoder station generally designated 12. The system co-operates with the conventional telephone circuits and thus includes, in addition to the dial telephones of a number of subscribers, the respective transmission lines 13 which connect the several subscriber stations to a dial exchange 14 from whence the calls are routed to the lines of called telephone subscribers, one of which is the master decoder whose line is shown at 15. The invention, in its broader aspects, makes use, at the subscriber station, of a tone generator designated 11*a* such as a transistor multivibrator (FIG. 4) energized by any of the input lines 16, 17 and 18 to effect the generation of respective tones which can be pulsed by an interruptor 11*b*. A pulse generator 11*c* is also provided at the subscriber station 11 to transmit a signal corresponding to the subscriber number of the central decoding station 12 through the telephone 10 to the exchange 14 in order to effect proper routing of the call to line 15. The interruptor 11*b* and the pulse generator 11*c* can be a common storage unit or the like in the housing of the subscriber alerting station (FIGS. 2 and 3). The alerting station further includes a means for rendering the telephone 10 operative, e.g. a lifting solenoid 11*d* designed to raise the receiver 10*r* of the telephone. The pulse generator or interruptor can then include means for triggering the disconnect button of the telephone upon elevation of the handset. A holding circuit 11*e* permits a full sequence of operations of the alerting station as will become apparent hereinafter. Line 16 can be provided with an inductive or capacitive pickup 19 responsive to the operation of a fire-alarm bell 20 when a conflagaration is detected at the protected premises by a thermo-sensitive device, smoke detector or other sensing unit 21. Similarly, line 17 has a pickup 22 co-operating either with a burglar-alarm bell 23 or with the sensing elements, trips etc. of the burglar-alarm system (not shown). Any conventional alarm system can be employed, according to this invention, the inductive or capacitive pickup 22 being removably mounted upon the alarm housing in the region of the bell coils by magnetic means or the like. The third warning system can include one or more switches 24, 25 disposed in the region of the telephone 10 or at locations within the protected premises remote from the telephone and co-operate with a source of electric current generally designated 26 to energize the tone generator 11*a* via line 18. At any of the pickups 19, 22 or at line 18, there can be provided a radiofrequency receiver responsive to a signal transmitted by a remote short-distance transmitter for suitable energization of lines 16, 17 and 18 without necessitating direct connection between the remote stations and those proximal to the subscriber warning station 11.

The central-system decoding station 12, according to the present invention, is provided with a line 15 which is connected in circuit with a pulse integrator 27 including a Schmitt trigger in which the second train of pulses arriving from the subscriber station and identifying said subscriber are sharpened and shaped so as to render them effective for operation of a digital code analyzer 28 which can be any shift-register circuit. An amplifier 29 is advantageously provided between the pulse integrator 27 and the pulse-code analyzer of shift register 28. The amplifier 39 feeds a tone analyzer 30 which can consist of three parallel-connected band-pass filter adapted to block but the respective tones and channel the latter to corresponding inputs of a read-out or selector circuit 31, these channels being represented by the lines 32, 33 and 34, respectively.

The operator station 35 according to this invention can be continuously manned and is provided with a warning lamp or other indicator rendered operative upon receipt of a coded signal at the pulse integrator 27 and line 36 to afford a notice that an alert has been sounded which may require monitoring. The output of the pulse-code analyzer 28 is returned to the operator station via a line 37 to give an immediate visual indication of the subscriber identification, which may be the subscriber's own telephone number. In this case, line 37 can feed a relay or the like, working into an additional calling line running from the decoder 12 to the exchange 14 to enable the operator to verify that it is indeed the indicated calling station which is transmitting a "busy" signal being then received.

When the pulse-code analyzer 28 has identified the calling party, the data-storage and retrieval system, generally designated 38, is operated to select from a mass of stored data that group of information corresponding to the subscriber identification. As indicated earlier, the storage and retrieval system should include a card-type collator and selector although it is also possible to operate with magnetic or analogous memory devices and the like. The card or other information group is then passed into a selector 31 as indicated by the line 39 whence the information corresponding to the appropriate transmitted tone is selected for use in accordance with which the channel 32, 33 or 34 has been energized by the tone analyzer 30, while the remainder of the information is disregarded. The selected information is then made available to the operator (line 40) so that he may immediately alert the appropriate agency in conformity with the message as recorded and/or a message-storage unit 41 having a bank of recording devices or the like upon which suitable messages of alert are stored. Assuming that the transmitted tone was indicative of a fire warning, a tape recorder provided with the appropriate message in the apparatus 41 can dial the local Fire Department and route a call through the appropriate exchange 42 to alert the Fire Department 43. As indicated earlier, the station 41 can comprise a bank of tape recorders with appropriate messages of each subscriber, or the entire group of subscribers; after being warned via line 40, the operator at the central alerting station may transmit any required specific message which is individual to that subscriber. Similarly, the message-storage unit can alert the Police Department 44 or a medical group 45, these agencies being representative of any agency which it may be desirable to inform of the state of events at the protected premises. Lines 46, 47 and 48 permit the operator to monitor at station 35 the transmitted signal so as to insure that it has been appropriately conveyed and received. The operator station can also be provided with a line 49 and a suitable pulse-and-tone generator for applying to the integrator 27 a train of signals corresponding to any which may be received from a subscriber, thereby permitting the unit to be tested thoroughly. Such testing is an effective measure of the efficiency of the device since conventional systems have frequently been prone to disorder and interruption of service which was not fully realized until an emergency occurred.

Figure 4:
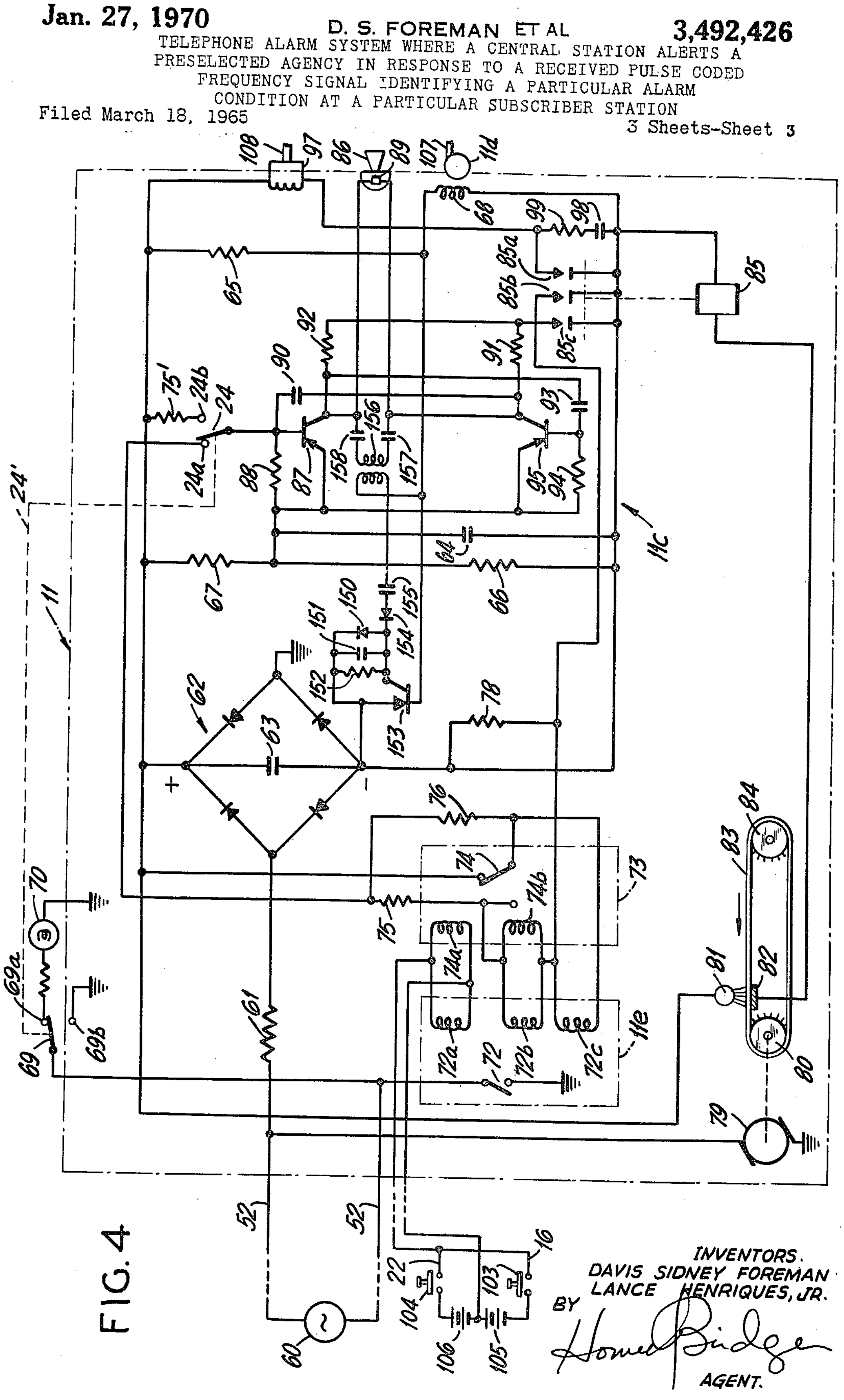
FIG. 4 is a circuit diagram of the unit, with an idealized illustration of the mechanical elements thereof.

In FIG. 4 there are shown, in diagrammatic form, the elements of a subscriber station co-operating with the telephone set at each protected location. The housing of the unit can be provided with the handset-raising solenoid 11_d_ which is of the rotary type and is provided with an arm 107 adapted to raise the handset from the telephone-disconnect button in the cradle of the instrument. The circuitry of the system can be connected with the usual alternating-current line, represented at 60, by a line cord 52 whose ungrounded or "hot" side supplies a rectifier bridge 62 via a current-limiting resistor 61.

The rectifier bridge 62 has its direct-current treminals in circuit with a voltage-divider network consisting of the resistors 65, 66, 67, across which the various direct-current voltages for operation of the various components of the circuit can be tapped. Filter capacitors 63 and 64, connected across the D-C output terminals serve to reduce any ripple remaining after full-wave rectification. The bridge 62 is energized upon closure of switch contacts connecting the ground side of the A-C line to the internal ground of the system and thus to the grounded side of the bridge 62. For this purpose, a switch 72 is provided for automatic energization of the unit upon receipt of a signal indicative of an unusual occurrence at the protected premises in a manner to be described in greater detail hereinafter. A manually operable switch 69 is also provided for this purpose, this switch 69 also serving to indicate that the unit is in a state of readiness as indicated by illumination of a panel lamp 70 of the neon-type connected in series with a voltage-dropping resistor 71 and the normally closed contacts 69_a_ of the switch 69. Thus the neon lamp will be illuminated as long as the unit is connected to the A-C source 60. The operation of the device can be tested manually by depression of switch 69 to close the normally open contacts 69_b_ and energize the bridge 62. The neon lamp is thus extinguished but reilluminates upon termination of the test cycle.

Upon such energization of the rectifying bridge, a D-C potential is applied across the resistors 66 and 67 and to the coil 68 in series with resistor 65 of the rotary solenoid 11_d_ to enable the arm 107 to elevate the handset. Concurrently, a positive potential is supplied to the tone generator, generally designated 11_c_.

The tone generator 11_c_, as described in its broader aspects earlier, comprises a pair of transistors 87 and 95 connected in a push-pull multivibrator-oscillator circuit, with the collectors connected across an electroacoustical transducer crystal 89 to generate an audio output. Capacitors 90 and 93 form the capacitive couplings between the multivibrator transistors, while resistors 88 and 94 provide the necessary emitter-collector biases and the additional resistors 91 and 92 are connected between the collectors across the crystal 89. It will thus be evident that a carrier tone can be generated which, by appropriate choice of the voltages applied to the transistors can be in the audio-frequency range. The frequency of the tone is determined by the potential applied to the base of transistor 87 and thus the magnitude of the resistance connected between this base and the terminal of the bridge 62.

To select a carrier frequency in accordance with the unusual occurence at the subscriber station, a manually operable switch 24 which may be ganged with switch 69 as illustrated at 24' and an automatically responsive switch 74 can be provided. Thus, when switch 24 is actuated, either as a trial of the warning system or to summon medical assistance or the like, the normally open contacts 24_b_ connect the resistor 75' in series with the bridge 62, thereby applying one potential, e.g. the C-signal, to the base of the frequency-controlling transistor 87 and causing a corresponding carrier frequency to be produced. In the normal position of switch 24, however, the closed contacts 24_a_ connects to this base resistors 75 and 76 of different ohmic values, which can be selectively tied to the negative bus bar via the switch 74 whose operation will be described subsequently. Thus, the switch 74 can apply either one or two characteristic potentials to the frequency-controlling transistor 87. The output from the oscillator 11_c_ supplies a transmitting element which, in this case, is the electro-acoustic transducer 89 of a microphone 86 aligned with the mouthpiece of the handset 10_r_ in its raised condition. Conventional inductive devices co-operating with the telephone line or the ringing coils of the telephone set 10 can also be employed for this purpose while, moreover, direct connection with the telephone line can be made if desired; this latter expedient is disadvantageous since it requires modification of the conventional telephone circuitry or equipment and is not necessary since effective results can be obtained merely by inductive or acoustical transmission of the carrier signal as described.

The unit also includes a dialing device here represented as the solenoid 97 whose armature 108 can co-operate via a lever, bar or the like with the telephone-disconnected button 10_c_ (FIG. 2) of the cradle when the handset is elevated. The solenoid 97 is energizable via the contacts 85_a_ of a relay 85 responsive to the stored digital signal to be employed for dialing the telephone number of the alerted station and transmitting thereto the requisite indicia of the origin of the call. The storage means of the subscriber unit can be any of the devices previously mentioned and is here shown as a pair of sprockets 80, 84, journaled in the housing of the unit and positively entraining an endless tape, band or strip (e.g. of motion-picture film) suitably treated to retain the desired information. While magnetic and optical and conductivity recording systems may be used, the endless band 83 by way of example, as a perforated tape through which contact can be made between a contact brush 81 and a contact plate 82 connected in series with the relay 85. The relay 85 is thus pulsed in the cadence of the stored digital data. Sprocket 80 is driven by a motor 79 which is connected across the A-C line 52 when either the switch 72 or the contacts 69_b_ are closed as previously indicated. The carrier frequency is also pulsed by the relay 85 which operates contacts 85_b_ by means of which the output of the oscillator is intermittently shortened to the bridge to block emission of the pulses.

The holding circuit 11_e_ of the unit comprises a three-winding polarizable or latching relay having a winding 72_a_ adapted to close the switch 72 and connect the supply 60 to the internal ground of the unit. For this purpose, switches 103 and 104 are illustrated, these switches being selectively and automatically operable in response to an unusual event at the protected premises. Thus switch 103 may correspond to the fire-alarm pickup 19, while switch 104 corresponds to the burglar-alarm pickup 22. Batteries 105 and 106 provide the necessary polarized, low-voltage direct current supplied jointly to the latching winding 72_a_, adapted to operate the switch 74, and the coil 74_a_ of the tone-selector relay 73. When coil 72_a_ is energized with a low voltage of either polarity, contacts 72 are closed and the recifying bridge 63 is energized to supply direct current to the oscillator 11_c_, the handset-raising solenoid 11_d_ and the dialing solenoid 97, the latter being supplied with electric current via the interrupting relay 85. Simultaneously, the bridge 62 energizes either coil 72_b_ or winding 72_c_ of the relay 11_e_, depending upon the position of switch 74. Even if the external source of energization (i.e. via switch 103 or 104) is removed and the winding 72_a_ de-energized, switch 72 will remain closed over one of the windings 72_b_ or 72_c_ until at least one complete cycle of operation has occurred. Energization of winding 74_a_ by one of these warning devices 103, 104 will be effected in adding or subtracting relationship to the field supplied by coil 74*b* so that, in the event of an adding field, the switch contact 74 will be swung clockwise into its dot-dash position whereas in the case of a subtracting field, the usual relay spring will hold the switch armature 74 in its solid-line position. It will, therefore, be apparent that energization of the winding 74*a* in additing relationship to the winding 74*b* (upon the closure of switch 103, for example), will result in connection of the resistor 75 in circuit with the normally closed contact 24*a* between the base of the frequency-controlling transistor 87 and the bridge 62. Conversely, operation of the switch 104 to energize the winding of 74*a* in buckling relationship with the winding 74*b* will connect the resistor 76 between the base of transistor 87 and the bridge. The R-C network consisting of resistor 99 and capacitor 98 is connected across the contacts 85*a* of relay 85 to suppress current surges resulting from energization of the dialing solenoid 97.

The system can be de-energized by a signal fed back over the telephone or upon completion of the cycle of the tape 83. For this purpose, the signal-receiving transducer 89, preferably aligned with the earpiece of the raised handset as described above, can energize a solid-state controlled rectifier through a differentiating transformer 156 in series with D-C blocking capacitors 157, 158. The controlled rectifier is provided with a pulse-shaping and biasing network 150, 151, 152, 154, 155 which provides the proper bias and establishes the pulse level necessary to operate the cut-off or other auxiliary devices. These can also be adapted to be operated by the usual busy signaling in the event a connection with the central station cannot be completed. When rectifier 153 is rendered conductive, it short-circuits the handset-raising solenoid 68. The bridge can also be short-circuited, if desired by way of a 3000 ohm resistor 78, for example, to thus de-energize the holding windings 72*b* and 72*c* and permit switch 72 to open. A similar result can be effected by the signal-storage means 83 merely by maintaining the relay 85 energized for a period sufficiently long to permit switch 85*c* to short-circuit the D-C bridge via the resistor 78. The normal pulsing operation of relay 85 will be insufficient to permit collapse of the holding field arising from winding 72*b* or 72*c*.

Referring now to FIGS. 2 and 3 wherein the physical arrangement of the unit 11 is shown in somewhat diagrammatic form, it will be seen that all of the circuitry within the dot-dash lines of the unit 11 (FIG. 4) is contained within a common housing generally designated 11' and mounted on the back of the telephone in the region of the cradle in which the handset 10*r* normally rests. A knurled screw 51 advantageously is rotatable in the housing 11' and adapted to move a hook-shaped finger 54 to the right so as to hold the housing 11' against the rear of the telephone by engagement therewith underneath its base. The handset 10*r* rests upon a lifting bar 107' (FIG. 3) with which the arm 107 of the solenoid co-operates, upon energization, to lift the handset to its dot-dash position 10*r'* (shown in FIG. 2). A further bar 108' bears lightly upon the disconnect button 10*c* of the telephone cradle and can be biased upwardly by the latter so that normal telephone operations, upon manual lifting of the handset, are not impeded. When the solenoid 11*d* is inoperative, the weight of the handset urges the bar 108' downwardly against the spring-loaded disconnect button to inactivate the telephone. Bar 108' is drawn downwardly by the armature 108 to operate the disconnect button in the dialing cadence and to transmit identification of the subscriber to the central station. As will be evident from FIGS. 2 and 3, the line cord 52 connects the unit 11 with the conventional A-C outlet while a multi-conductor cable 53 can have a jack suitably dimensioned in the housing 11' to permit multiple connection for, for example, several energizing inputs 19, 22, 103, 104, and any other connection which may be desired. The housing is, moreover, formed with openings 86' and 100' for the transducer 86 aligned with the transmitter of the handset.

OPERATION

In the quiescent state of the installation, switch 69 is in the position illustrated and the neon lamp 70 is is illuminated to indicate a state of readiness. The handset 10*r* of the subscriber's telephone 10 holds the bar 108' down against the telephone-disconnect button 10*c* (FIG. 2) and, since neither switch 72 nor contact 69*b* are closed, all of the various circuits of the unit 11 remain inactive. Upon energization of the fire alarm 20, 21 or the burglar alarm 23, the respective pickup 19 or 21 is energized. Since these pickups correspond to switches 103 and 104, respectively, one of these switches is closed to energize the windings 72*a* and 74*a* to close the power switch 72 and orient the switch 74 in accordance with the particular switch 103, 104 energized. Power is now supplied to the bridge 62 which, in turn, energizes the oscillator 11*c* to produce the carrier frequency determined by this orientation of switch 74. Concurrently, motor 79 is energized and the signal-storage band 83 triggers the relay 85 in accordance with the prerecorded digital data corresponding to the telephone number of the central station 12. Moreover, the bridge 62 also energizes the coil 68 of the handset 10*r* to its elevated position 10*r'* out of engagement with the bar 108'. The pulse cadence applied to the relay 85 is transformed into the triggering of the dialing solenoid 97 which, via its armature 108 and the bar 108', trips the disconnect switch and button 10*c* in the same cadence to "dial" the standard telephone number of the central station 12 and thus effect a connection via the conventional exchanges 14 with the central station. Following this first group train of pulses adapted to dial the central station, the storage band 83 applies to the relay 85 and the dialing solenoid 97 a second train of pulses in the form of interruptions of the audio frequency signal as transmitted by the transducer 86 to the receiver of the telephone. The audio signals in the form of a pulsed carrier can be fed through a pulse-sharpening integrator 27 which can include any conventional integrator circuit of the type described, for example, in the publication Transients or Wave Forms, TM–11–669, U.S. Government Printing Office, Washington, D.C., or the publication Pulse Techniques, TM11–672, U.S. Government Printing Office (1951). The output of the pulse integrators is fed to a conventional amplifier circuit 29 of the type described, for example, in Designing a Transistor A–F Amplifier, Electronics, April 1958. From the amplifier, the signal can be fed into a pulse-code analyzer 28 in the form of a shift register of the type employed in U.S. Patent 3,052,405 and others of this class. The shift register operates the data storage and retrieval arrangement having selective readout as diagrammatically illustrated at 31 and 38, the perforated cards being scanned for example, as described in this latter patent. Similar scanning, retrieval and readout devices suitable for use with the present invention are described in U.S. Patents Nos. 2,688,703; 2,697,749; 2,727,685; 2,750,518 and 2,770,797, the shift register and punch-card installation being any of the well-known type discussed in Mathematical Machines, vol. 1, Columbia University Press, 1961; Punched Card Methods in Scientific Computation, Columbia University Press, 1940; Office of Naval Research, Survey of Automatic Digital Computers, Report No. 111293, U.S. Dept. of Commerce, Washington, D.C., 1953; and Computers, Berkeley and Wainwright, N.Y., Reinhold Publishing Corp., 1956.

After appropriate warning has been transmitted to the proper agency as previously described, a signal is transmitted from the operator station through the telephone line to the handset to trigger the rectifier 153 and reset the apparatus.

The invention described and illustrated is believed to admit of many modifications within the ability of persons skilled in the art, all such modifications being considered within the spirit and scope of the appended claims.

We claim:

1. A method of operating a communication system having a multiplicity of subscriber stations constituting protected premises provided with respective handset telephones, a central exchange for routing calls from said subscriber station, transmission means between said subscriber stations and said exchange, and a central alerting station connected with said exchange and adapted to receive communications from said subscriber stations via said exchange whereby an indication of any one of a plurality of unusual circumstances at any of said subscriber stations will be communicated to said alerting station for the institution of corrective action, said method comprising the steps of:

generating a first electrical signal responsive to a respective unusual circumstance at the protected premises of a corresponding subscriber station;

connecting the respective telephone at said corresponding subscriber station with said exchange upon the development of said first signal;

transmitting via the last-mentioned telephone and the transmission means associated therewith a coded second signal adapted to activate said exchange and interconnect said last-mentioned telephone with said central alerting station;

transmitting to said central alerting station through the handset transmitter of said last-mentioned telephone a pulse-coded acoustical third signal from said last-mentioned telephone indicative of identification of said corresponding subscriber station and of a characteristic frequency representative of the appropriate one of a set of unusual circumstances at said corresponding subscriber station, each of the unusual circumstances at each of said subscriber stations being associated with a characteristic frequency of the third signal adapted to be transmitted by the respective subscriber station, said acoustical third signal being transmitted to said central alerting station by:

sensing the unusual occurrence occurring at the corresponding subscriber station and producing an electrical output representative thereof, selectively switching an oscillator at the corresponding subscriber station in response to the representative electrical output to produce a characteristic output signal of associated frequency, and operating an electroacoustical transducer positioned close to said handset transmitter with said characteristic output;

storing sets of information corresponding to each of said subscriber stations to form a collection of such sets, each of said sets including information items respectively assigned to each of the characteristic frequencies of the third signal adapted to be transmitted by the respective subscriber station, thereby enabling the alerting station to respond to each of the unusual circumstances capable of occurring at each of said subscriber stations;

deriving from said collection of stored information sets the information set assigned to said corresponding station upon receipt of the pulse-coded third signal received therefrom at said central alerting station; and reading out the information item corresponding to the frequency of said pulse-coded third signal from the derived information set.

2. The method defined in claim 1 wherein the derived information set is retrieved automatically from said collection and the read-out information item is selected automatically upon receipt of said third signal from said corresponding subscriber station at said central alerting station, said method further comprising the steps of:

prerecording and storing at said central alerting station a multiplicity of messages for transmission to agencies to be alerted upon the development of said unusual circumstances and suitable for transmission from said central alerting station to the respective agencies; and automatically selecting from among the prerecorded messages stored at said central alerting station in accordance with the coded third signal and the characteristic frequency thereof a message for transmission to the agency dealing with the unusual circumstance occurring at the protected premises of said corresponding subscriber station.

3. A method of operating a communication system having a multiplicity of subscriber stations constituting protected premises provided with handset telephones, a central exchange for routing calls from said subscriber stations, transmission means between said subscriber stations and said exchange, and a central alerting station connected with the exchange and adapted to receive telephonic communications from said subscriber stations via said exchange whereby an indication of any one of a plurality of unusual circumstances at any one of said subscriber stations will be communicated to said alerting station for the institution of corrective action, said method comprising the steps of:

generating a first electrical signal responsive to a respective unusual circumstance at the protected premises of a corresponding subscriber station;

connecting the respective telephone at said corresponding subscriber station with said exchange upon the development of said first signal;

transmitting via the last-mentioned telephone and the transmission means associated therewith a coded second signal adapted to activate said exchange and interconnect said last-mentioned telephone with said central alerting station;

transmitting to said central alerting station a coded third signal from said last-mentioned telephone indicative of identification of said corresponding subscriber station and of a frequency respresentative of the appropriate one of a set of unusual circumstances at the protected premises of said corresponding subscriber station, each of the unusual circumstances at each of said subscriber stations being associated with a characteristic frequency of the third signal adapted to be transmitted by the respective subscriber station;

storing sets of information corresponding to each of said subscriber stations at said central alerting station to form a collection of such sets, each of said sets including information items respectively assigned to each of the characteristic frequencies of the third signal adapted to be transmitted by the respective subscriber station, thereby enabling the alerting station to respond to each of the unusual circumstances occurring at each of said subscriber stations;

deriving from said collection of stored information sets, the information set assigned to said corresponding subscriber station in accordance with the third signal therefrom received at said central alerting station;

reading out the information item corresponding to the frequency of said third signal from the derived information set; and checking the source of the third signal received at said alerting station by dialing the telephone number of said corresponding subscriber station at a telephone at said alerting station, thereby routing a telephone call from said alerting station through said exchange to said corresponding subscriber station and obtaining an indication of use of the corresponding subscriber station.

4. A method as defined in claim 3 wherein the characteristic frequencies of the third signals are in the audiofrequency range and are transmitted from the respective subscriber stations to said alerting station through the transmitter of the handset associated with the respective subscriber station, further comprising the step of transmitting a signal from said alerting station to said corresponding subscriber station while the latter is connected with said alerting station to disconnect said corresponding subscriber station.

5. The method defined in claim 3 wherein the telephone of a subscriber station associated with an unusual circumstance is connected with the exchange by elevating its handset and thus releasing the respective telephone disconnect.

6. In a telephone-communication system having a multiplicity of subscriber stations at respective protected premises each provided with at least one telephone, at least one central exchange for routing calls to and from said subscriber stations, and transmission means interconnecting said subscriber stations and said exchange, the improvement which comprises means responsive to any one of a plurality of unusual circumstances at any of said subscriber stations for effecting the alerting of an appropriate agency, the last-mentioned means comprising:

a central alerting station provided with:

a telephonic connection with said exchange activatable by a coded signal, storage means for a collection of information sets each associated with a respective subscriber station and containing individual items of information characteristic of a plurality of unusual circumstances capable of developing at the respective subscriber station, pulse-code-responsive information retrieval means for automatically abstracting from among said collection of information sets, a selected information set, and frequency-discriminator means for deriving from the information set abstracted from said collection, automatically, a selected item of information corresponding to a characteristic frequency detected by said frequency-discriminator means;

a plurality of sensing units at each of said subscriber stations responsive to the development of different unusual circumstances corresponding to the items of information stored within an information set assigned to the respective subscriber station and adapted to generate respective first signals corresponding to the different unusual circumstances; and a signal-generating unit at a telephone of each of said subscriber stations and cooperating therewith while being operatively connected with said sensing units of the respective subscriber station for connecting the corresponding telephone to said exchange upon the development of a first signal by any of the sensing units of the corresponding subscriber station, said signal-generator unit including:

means for transmitting a coded second signal to said exchange to establish telephonic communication therethrough between said corresponding subscriber station and said central alerting station, means for transmitting a pulse-coded third signal from the telephone of said corresponding subscriber station to said central alerting station upon the establishment of telephonic communication therewith to operate said information retrieval means and causing the abstraction thereby of the selected information set assigned to said corresponding subscriber station, thereby indicating to said central alerting station the source of an alert, and frequency-generating means for imparting to said third signal a characteristic frequency assigned to the developed first signal of an operative sensing unit at said corresponding subscriber station, said frequency-generating means having a plurality of characteristic frequencies corresponding to the first signals of said sensing elements and the items of information of the respective information set stored at said central alerting station, said frequency-generating means being operatively connected to said sensing units and being constructed and arranged to operate said frequency-discriminator means and cause selection of the information item corresponding to the operative sensing unit, said frequency-generating means including a multifrequency oscillator at each of said telephones, switch means operatively connected to said sensing units of each subscriber station and to said oscillator for selectively energizing the latter to produce a characteristic output signal of the associated frequency upon triggering of the corresponding sensing unit, and transducer means operatively connected to the oscillator of each of said telephones for transmitting thereover the associated frequency.

7. In a system for transmitting an indication of an unusual circumstance from a protected premises to a central alerting station via a telephone-communication system including a subscriber station with a handset telephone and an exchange for connecting said telephone with said central alerting station the improvement which comprises a signal-transmitting unit including:

a housing mounted proximally to said telephone, said telephone having a cradle provided with a telephone-disconnect button and a handset having a transmitter and a receiver normally resting in said cradle in an inoperative condition of said telephone;

mechanism extending from said housing into the region of said cradle and engageable with said handset for elevating same, said mechanism being operable to prevent said handset from depressing said disconnect button;

signal-storage means in said housing including an elongated recording band and pick-up means cooperating with said band for generating a routing signal applicable to said telephone in the elevated condition of said handset to connect said telephone with said central alerting station through said exchange, and for generating a further signal upon connection of said telephone with said central alerting station for communicating to said central alerting station an identification of the subscriber station associated with said telephone;

solenoid means cooperating with said pick-up means and adapted to be pulsed thereby;

tripper means operable by said solenoid in an elevated condition of said handset for triggering said disconnect button and thereby dialing the telephone number of said central alerting station;

circuit means in said housing responsive to an external manifestation for sequentially energizing said mechanism and said signal-storage means to produce an output at said central altering station corresponding to said manifestation; and frequency-generating means in said housing having an audio-frequency oscillator with a plurality of characteristic output frequencies each corresponding to a respective unusual occurrence and circumstance at the protected premises and adapted to constitute at least part of said further signal, said housing being disposed rearwardly of said telephone and having a portion of said housing in proximity to said transmitter in an elevated position of said handset as established by said mechanism, said frequency-generating means including an electroacoustical transducer mounted at said portion and connected in circuit with said oscillator for applying an audiofrequency output constituting said part of said further signal to said transmitter, said oscillator comprising a pair of transistors connected in a multivibrator-oscillator network with said transducer, and means for applying a plurality of charatceristic potentials to the base of at least one of said transistors to establish the characteristic output frequency of said oscillator.

8. A system as defined in claim 7 wherein the last-mentioned means include a plurality of resistors selectively connectable between said base and a source of energization potential for said transistors, and polarizable relay means having contacts in circuit with said resistors for selectively connecting them between said source and said base, said relay means having a pair of low-voltage windings energizable in accordance with said manifestation for shifting said relay means between two alternate conditions corresponding to different unusual circumstances capable of developing at the protected premises.

9. A system as defined in claim 8 wherein said housing is provided with a jack for the connection of a plurality of sensing elements to said circuit means, each of said sensing elements being associated with a respective characteristic frequency.

References Cited

UNITED STATES PATENTS

| | | | |
|---|---|---|---|
| 3,178,658 | 4/1965 | Henrion | 331—113 X |
| 2,870,258 | 1/1959 | Cooper | 179—2 |
| 3,029,642 | 4/1962 | Burhans et al. | 179—2 X |
| 3,062,920 | 11/1962 | Sohacki | 179—5 X |
| 3,087,991 | 4/1963 | Anderson et al. | 179—5 |
| 3,095,478 | 6/1963 | Adams | 179—5 |
| 3,207,850 | 9/1965 | Foreman | 179—5 |
| 3,124,650 | 3/1964 | Rostad | 179—5 |

KATHLEEN H. CLAFFY, Primary Examiner

T. W. BROWN, Assistant Examiner

U.S. Cl. X.R.

179—2; 340—313, 412